Oct. 4, 1927.
J. A. BROOKS
1,644,632
CAR SEAT
Filed April 1, 1927
2 Sheets-Sheet 1
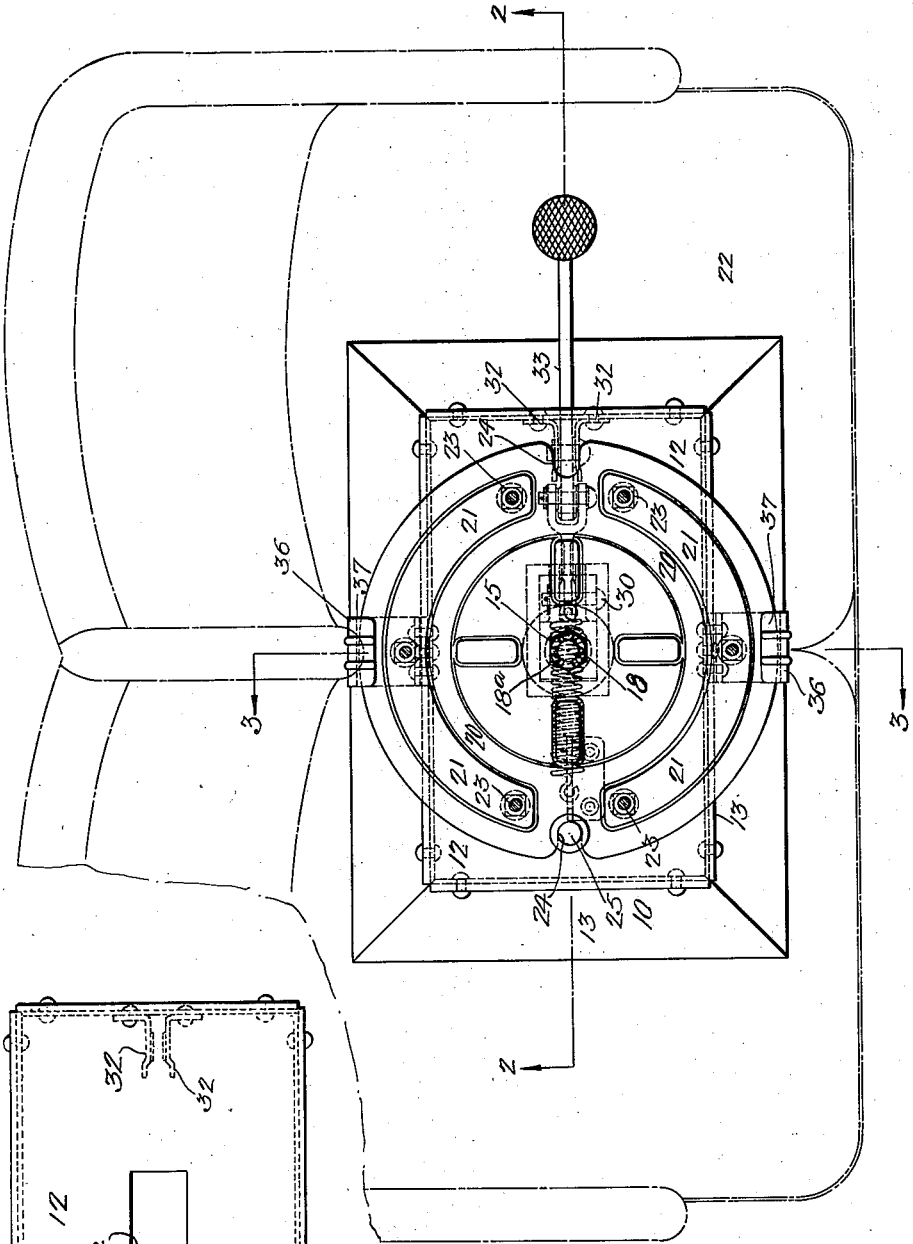
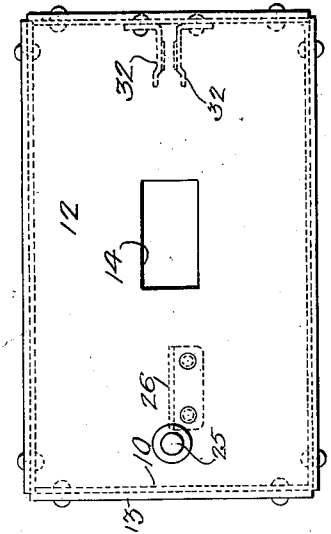
Inventor,
James A. Brooks,
by his Attorneys Oct. 4, 1927.
J. A. BROOKS
1,644,632
CAR SEAT
Filed April 1, 1927
2 Sheets-Sheet 2
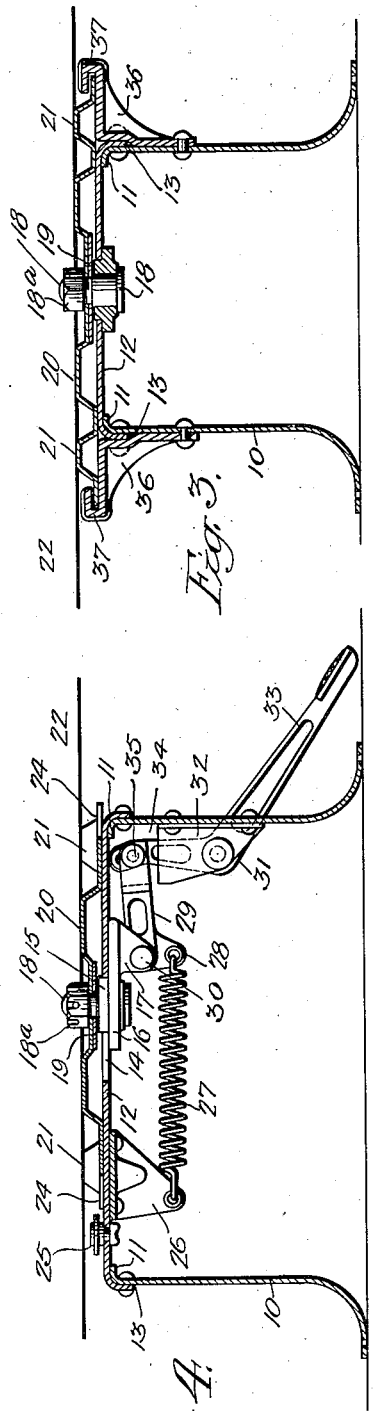
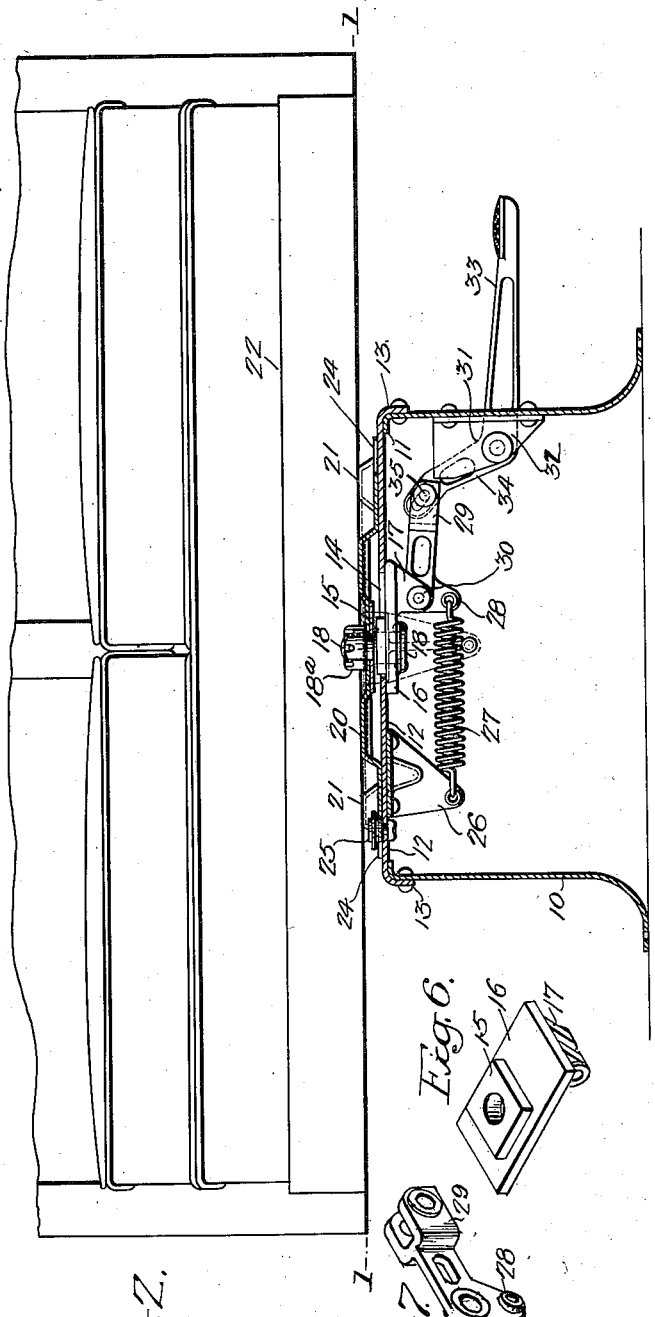
Inventor:
James A. Brooks
by his Attorneys, Patented Oct. 4, 1927.

1,644,632

UNITED STATES PATENT OFFICE.

JAMES A. BROOKS, OF KIRKLYN, PENNSYLVANIA, ASSIGNOR TO THE J. G. BRILL COMPANY, OF PHILADELPHIA, PENNSYLVANIA, A CORPORATION OF PENNSYLVANIA.

CAR SEAT.

Application filed April 1, 1927. Serial No. 180,195.

This invention relates to certain improvements in seats for passenger cars and other vehicles.

The object of the invention is to construct a car seat which can be located close to the sides of the car and which can be moved laterally from the side of the car and turned when it is desired to reverse the seat, the lateral movement unlocking the seat so that it can be readily turned.

In the accompanying drawings:

Fig. 1 is a sectional plan view on the line 1—1, Fig. 2, illustrating the mechanism of my improved car seat, the seat structure being shown by dotted lines;

Fig. 2 is a front elevation of the seat structure showing the base and seat plate in section on the line 2—2, Fig. 1;

Fig. 3 is a sectional view on the line 3—3, Fig. 1;

Fig. 4 is a sectional view of the base and seat plate on the same line as Fig. 2, illustrating the operating lever depressed and the seat plate moved to the turning position;

Fig. 5 is a plan view of the base;

Fig. 6 is a detached perspective view of the slide; and

Fig. 7 is a detached perspective view of the link.

The base 10 is made of pressed sheet metal and is rectangular in plan as shown in Fig. 1. The lower portion of the base is flared to provide a substantial support for the seat.

The base has an internal flange 11 at the upper edge. This flanged portion of the base supports a platform 12 having turned down flanges 13 at the sides and ends which are riveted or otherwise secured to the base 10.

In the base is an elongated opening 14, rectangular in shape, in which is located a rectangular projection 15 forming an integral part of a slide 16 having depending lugs 17.

This slide carries a pivot pin 18 which extends through a seat plate 20 and a washer 19 mounted to slide and to turn on the platform. The seat plate and washer are held in position on the pivot pin by a nut 18ª.

The seat plate 20 is circular in form as shown in Fig. 1, and has segmental raised portions 21 upon which the seat structure 22 is mounted. Bolts 23 extend through the raised portions of the seat plate and into the seat structure.

The seat plate 20 is notched at each side as at 24 to receive the flanged locking pin 25 which projects from the platform 12 after the seat is turned to either of its two positions and moved towards the side of the car.

Depending from the platform 12 is a bracket 26 to which is attached one end of a coiled spring 27, the other end of the spring being attached to an arm 28 of an operating link 29 pivoted at 30 to the lugs 17 on the slide 16.

The operating lever 31 is pivotally located between two brackets 32 secured to the inner side of the base 10. The long arm 33 of the lever extends through a slot in the base and has a foot pad at its outer end. The short arm 34 of the lever has a slot therein, and a pin 35 on the link 29 extends through the slot as shown in Fig. 2.

On depressing the long arm of the operating lever 31, the slide is moved from the position shown in Fig. 2 to that shown in Fig. 4. The slide, being pivoted to the seat plate which is secured to the seat structure, moves the seat plate clear of the locking pin 25 on the platform, and the seat structure can then be turned on its pivot, as it has been moved a sufficient distance from the side of the car to allow it to be turned.

As soon as the operating lever is released, the spring 27 returns the parts to their normal position, and the seat plate engages the pin 25, locking the seat structure from turning on its pivot.

The link 29 has a squared end which, when the seat structure is in its normal position, is in front of the brackets 32. The spring retains the link in this position, thus locking the slide and the seat structure against lateral movement until the link is raised clear of the brackets by the operating lever, as in Fig. 4.

At each side of the base is a bracket 36, secured thereto, in the present instance, by rivets (Fig. 3). These brackets have lips 37 which extend over the edge of the seat plate 20 and prevent the seat tipping backwards when in either of its two positions.

I claim:—

1. The combination in a car seat, of a base having a platform, said platform having a slot therein; a slide having a projection extending into the slot; a pivot pin on the slide; a seat plate mounted on the pivot pin and resting on the platform; a spring tending to force the slide in one direction; a lever for moving the slide in the opposite direction; a pin arranged to lock the seat plate in either of its two positions; and a seat structure secured to the seat plate.

2. The combination in a car seat, of a base; a platform thereon having an elongated slot therein extending to one side of the centre; a slide located under the platform and having a projection extending into the slot; a pivot pin on the slide; a seat plate mounted on the pin and supported by the platform, said plate having two notches in its periphery; a locking pin on the platform arranged to enter one of the notches when the plate is moved to its normal position; a link pivoted to the slide; an operating lever connected to the link; and a spring attached to the link tending to return the slide to its normal position and to force the link down into line with a stop to lock the slide against longitudinal movement.

3. The combination in a car seat, of a base; a platform thereon, said platform having a guide; a slide adapted to the guide; a seat plate pivotally mounted on the slide; a link pivoted to the guide; an operating lever connected to said link, said link having an arm; a spring attached to the arm of the link; and a stop to limit the movement of the link and slide until said link is moved clear of the stop by the operating lever.

4. The combination in a car seat, of a base; a platform thereon, said platform having a guide; a stop pin projecting from the platform; a slide adapted to the guide; a seat plate pivotally mounted on the slide, and having notches arranged to be engaged by the stop pin; and means for moving the slide and seat plate so that said seat plate will clear the stop pin, after which it can be turned, and when released the seat plate will be again engaged by said stop pin.

5. The combination in a car seat, of a base having a platform therein; a guiding slot in said platform; a slide located under the platform and having a portion extending into the slot; a pivot pin on the slide; a seat plate mounted on the pin; a seat structure secured to the seat plate; a pin projecting from the platform, said seat plate having two notches arranged to receive the pin when the seat plate is in either of its two positions, the slide having depending lugs; a link pivoted to the lugs; an operating lever; brackets to which said lever is pivoted, the brackets being in line with the end of the link when said link is in its normal position to lock the slide, said link having an arm; and a spring attached to said arm and to the base and arranged to retract the slide and move the link into position in line with the brackets.

JAMES A. BROOKS.